United States Patent [19]

Huttunen et al.

[11] 4,404,369
[45] Sep. 13, 1983

[54] METHOD OF PRODUCING ALKALI-SOLUBLE CELLULOSE DERIVATIVE

[75] Inventors: Jouko Huttunen; Olli Turunen; Leo Mandell; Vidar Eklund; Kurt Ekman, all of Porvoo, Finland

[73] Assignee: Neste OY, Finland

[21] Appl. No.: 341,133

[22] Filed: Jan. 20, 1982

[30] Foreign Application Priority Data

Jan. 27, 1981 [FI] Finland .................................. 810226

[51] Int. Cl.$^3$ ............................................. C08B 15/06
[52] U.S. Cl. ..................................................... 536/30
[58] Field of Search .......................................... 536/30

[56] References Cited

U.S. PATENT DOCUMENTS

| | | | |
|---|---|---|---|
| 1,173,336 | 2/1916 | Bonner | 536/30 |
| 1,771,461 | 7/1930 | Lilienfeld | 536/30 |
| 2,007,950 | 7/1935 | Dreyfus | 536/30 |
| 2,073,052 | 3/1937 | Dreyfus | 536/30 |
| 2,129,708 | 9/1938 | Schreiber | 536/30 |
| 2,134,825 | 11/1938 | Hill et al. | 536/30 |
| 2,145,273 | 1/1939 | Peterson et al. | 536/30 |
| 2,294,925 | 9/1942 | Miller et al. | 536/30 |
| 4,124,758 | 11/1978 | Watts et al. | 536/30 |

Primary Examiner—Ronald W. Griffin
Attorney, Agent, or Firm—Steinberg & Raskin

[57] ABSTRACT

An alkali-soluble cellulose derivative is produced by treating cellulose with liquid ammonia having urea dissolved therein, removing the ammonia, resulting in cellulose having urea distributed therethrough, and heating the thus obtained cellulose-urea to cause reaction between the urea and cellulose and form alkali-soluble cellulose carbamate. This cellulose carbamate can be precipitated from alkaline solution in the form of cellulose carbamate film or fiber.

8 Claims, No Drawings

METHOD OF PRODUCING ALKALI-SOLUBLE CELLULOSE DERIVATIVE

BACKGROUND OF THE INVENTION

The so-called viscose method of producing dissolvable cellulose is generally used in the manufacture of regenerated cellulose. According to this method alkali cellulose is prepared and is reacted with carbon disulfide to form cellulose xanthogenate. The cellulose xanthogenate may be dissolved in alkali solution and regenerated by precipitation in film or fiber form to again become cellulose. However, the carbon disulfide used in this process is an extremely toxic substance and many attempts have been made to find a substitute chemical to replace the carbon disulfide, a chemical which would be sufficiently economical for large scale use and which would not cause the detrimental environmental and health effects of carbon disulfide. However, no commercial method or process has as yet been developed.

Finnish Patent No. 61033 discloses a process for the manufacturing of an alkali-soluble cellulose compound without using carbon disulfide or any other environmentally harmful chemicals. In this method cellulose is heated with urea in an organic liquid in which urea is substantially insoluble. The cellulose carbamate, which is the reaction product, is soluble in alkali and can be precipitated from the solution in fiber or film form. However, although this method results in a degree of solubility of fibers which is sufficient for large scale spinning, the need to use organic solvents in the process causes numerous problems, for example in connection with recovery and purification of waste water.

It is therefore desirable to find an alternative to the use of organic liquids or solvents which can, however, lead to an end result at least as good as that resulting from the process of using the organic solvents.

DESCRIPTION OF THE INVENTION

In accordance with the present invention, an alkali-soluble cellulose derivative is produced by the reaction of cellulose with urea at elevated temperature by treating the cellulose with urea dissolved in liquid ammonia, the ammonia penetrating into the cellulose along its crystalline elements and carrying along with it the dissolved urea, after which the ammonia is removed, for example simply by evaporation, and the cellulose containing the urea is heated to a temperature sufficiently high for reaction between the cellulose and the urea, thus forming alkali-soluble cellulose carbamate.

It is accordingly a primary object of the present invention to provide a method for the manufacture of alkali-soluble cellulose carbamate from cellulose and urea by a method which does not require the use of any organic solvents.

It is a further object of the present invention to provide for the production of cellulose carbamate by the reaction of cellulose and urea by a method which does not require the use of organic solvents and which provides an alkali solubility, as measured by the clogging number of the solution, which is as good or better than the cellulose carbamate produced by the reaction of cellulose with urea in the presence of organic solvents.

It is yet a further object of the present invention to provide a method of manufacturing alkali-soluble cellulose carbamate from cellulose and urea by a method which not only avoids the use of organic solvents but which results in simple recovery of all unused reactants so as to provide an economical and environmentally satisfactory process.

Other objects and advantages of the present invention will be apparent from a further reading of the specification and of the appended claims.

With the above objects in view, the present invention mainly comprises treating cellulose with liquid ammonia having urea dissolved therein, at a temperature below the reaction temperature of the cellulose with the urea, to cause distribution of the urea throughout the cellulose, removing the ammonia, and heating the cellulose and urea at a temperature sufficiently high to cause reaction between the cellulose and the urea to thus form the desired cellulose carbamate.

When urea is heated to its melting point or to a higher temperature, it begins to decompose, forming isocyanic acid and ammonia. Isocyanic acid is not a particularly stable compound and it tends to become trimerized into isocyanuric acid. Further, isocyanic acid also tends to react with urea, whereby biuret is formed. Isocyanic acid also reacts with cellulose, producing an alkali-soluble cellulose compound which is called cellulose carbamate. The reaction may be written as follows:

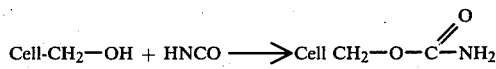

The thus produced compound, cellulose carbamate, may be dried after washing and stored even over prolonged periods, or it may be directly dissolved in alkali solution. From this solution may be made e.g., cellulose carbamate fibers by spinning, in like manner as in the viscose manufacturing process. The stability of cellulose carbamate and the feasibility of its transport in dry state afford a great advantage compared with the cellulose zanthogenate of the viscose process, since the latter cannot be stored or transported, not even in solution form.

The manufacture of cellulose derivatives with the aid of urea has been known in the art for a long time. Thus, U.S. Pat. No. 2,134,825 discloses a process for manufacturing a soluble cellulose derivative from cellulose and urea. According to this process, cellulose fibers are steeped in a sodium hydroxide solution of urea. The water is removed by evaporation and the cellulose is heated to cause reaction between the cellulose and the urea.

However, the product produced by the method of U.S. Pat. No. 2,134,825 is only partly soluble in alkaline solutions. The solutions contain considerable amounts of insoluble fiber fragments, which impede the filtering of the solutions and prevent the spinning of fibers which is accomplished by passing the solution through nozzles having sufficiently small holes.

An attempt has been made in the patent to improve the solubility by the addition of zinc oxide to the sodium hydroxide solution of urea. However, the results are unsatisfactory.

The method of the present invention provides for uniform distribution of the urea throughout the cellulose, and it is believed that the poor solubility of the cellulose compound produced by the method of treating cellulose with a sodium hydroxide solution of urea, with or without the addition of zinc oxide, results from the urea not being sufficiently uniformly distributed throughout the cellulose fibers in the steeping phase. As a result, the end product is not homogeneous. Furthermore, when an aqueous solution of sodium hydroxide is used as the solvent for the urea, the sodium hydroxide remaining on the fibers after evaporation causes a powerful reduction of the degree of polymerization, and this is most undesirable because of the poor quality of the end product.

These disadvantages are all avoided by the process of the present invention wherein the cellulose is first treated with liquid ammonia containing the urea, after which the ammonia is removed and the cellulose is reacted with the urea at an elevated temperature.

The process of the present invention provides remarkable advantages as compared to the above described prior art processes, these advantages being gained by the use of the liquid ammonia as the medium for distributing the urea onto the cellulose fibers. In order to achieve good solubility in the cellulose carbamate product, the degree of substitution of the product must be uniform. In order to assure a uniform degree of substitution, it is necessary to achieve uniform penetration of the urea into the cellulose. It has been found according to this invention that liquid ammonia is perfectly suited for this purpose because it enters into the cellulose along its crystalline elements carrying with it the dissolved urea. In this manner, a uniform distribution of the urea in the cellulose fibers is obtained. Moreover, the isocyanic acid produced upon decomposition of the urea, when the urea and cellulose react at elevated temperature, has a chance to attach to the hydroxyl radicals of the cellulose "in statu nascendi". Because of the uniform degree of substitution, the result is that even with low degrees of substitution, the resulting cellulose derivative is fairly readily soluble. Another significant advantage of the use of ammonia in accordance with the method of the invention is that the ammonia is easy to remove from the cellulose by evaporation, and its recovery and reuse are considerably simpler than in the case of the use of liquid hydrocarbons.

In accordance with the method of the invention, the treatment of the cellulose fibers with liquid ammonia is effected at a temperature which may be higher or lower than the boiling point of the ammonia. In the first mentioned case, it is of course necessary to use a pressure vessel because the boiling point of ammonia is $-33°$ C. It should be noted, however, that from the standpoint of the invention, it does not matter which alternative is used, i.e. treatment above or below the boiling point of the ammonia. The only significance with respect to the selection of the temperature is that the solubility of urea in ammonia increases with increasing temperature. It is preferred, in accordance with the present invention to effect the steeping of the cellulose with the liquid ammonia containing the urea at a temperature of between about $-40°$ C. to about $+10°$ C.

The quantity of urea in the ammonia can be selected within rather wide limits depending upon other process variables. Normally, the adequate quantity of urea is between about 30 and 120% by weight, calculated with respect to the weight of the cellulose corresponding to a urea/cellulose ratio of 0.5 to 3. The urea/cellulose ratio must have such height for a uniform enough degree of substitution to be achieved. If on the other hand the urea/cellulose ratio is unnecessarily high, urea will be consumed and lost in side reactions. Experiments in practice have shown that the useful range of the ratio is 0.5–3. The quantity of urea chosen in each instance depends on variables such as the reaction temperature and reaction time. The required steeping time also depends on variables such as the temperature at which the steeping takes place and the amount of urea in the steeping solution. The steeping time is normally selected to be within a few minutes to 10 hours.

After the cellulose has been treated for the desired time with the solution of urea in ammonia, the ammonia is removed in any convenient manner. The result is that the urea remains as a residue, evenly distributed through the cellulose. It is of course preferred to recover and reuse the ammonia. For evaporation of the ammonia, it is possible to utilize vacuum evaporation and/or heating.

The reaction between the urea and the cellulose is effected at elevated temperature subsequent to the removal of the ammonia. The temperature utilized depends on variables such as the quantity of urea and on the steeping conditions. In general, the temperature utilized is not less than 110° C. and it is unnecessary to utilize the temperature above about 150° C. The requisite reaction time usually varies from one hour to several hours. The heating and reaction of the cellulose and urea are favorably effected at subatmospheric pressure, whereby the $NH_3$ that is formed is thus rapidly voided from the reaction volume.

On completion of the reaction between the cellulose and the urea, the end product is washed once or several times with methanol and dried in normal manner. Preferably, however, the end product is washed with liquid ammonia resulting in the advantage that the biurets which are formed as a by-product of the reaction can at the same time be converted into urea and reused.

The dried end product, that is the resulting cellulose carbamate, is stable in dry state and can be stored or transported as is. This is a considerable advantage as compared to the viscose process, wherein the xanthate which is produced by the reaction of the carbon disulfide is not a stable compound and can neither be stored nor transported for use elsewhere.

The cellulose carbamate compound manufactured by the process of the invention can at any time be formed to cellulose carbamate fiber or film, simply by dissolving the carbamate in sodium hydroxide.

The amount of urea in the liquid ammonia can vary within wide limits, amounts of urea of 1–150% of the amount of the ammonia being suitable.

The cellulosic starting material used in the process of the invention may be wood cellulose, or cotton, or it may consist of other natural or artificial fibers containing cellulose. The cellulose may enter the process in its inherent state, or in bleached condition, as cellulose hydrate, alkali cellulose or in a form treated in another way, for instance with adids. Furthermore, the cellulose that is used may be in the form of fibers, yarns, films, sheets, etc.

The degree of polymerization of the cellulose that is used has significance regarding the viscosity of the end product. If the starting material is common wood cellulose or cotton, the soluble end product will have a high viscosity and therefore such solutions are obtained wherein the cellulose content should be left comparatively low. Using cellulose wherein which the degree of polymerization has been somewhat lowered, solutions can be manufactured which have a correspondingly higher cellulose content. The degree of polymerization of the cellulose used as starting material can be regulated e.g. by treating the cellulose in 18% sodium hydroxide solution. Through the influence of air, depolymerization of the cellulose ensues, and this can be interrupted at the desired degree of polymerization by washing with water and drying. Cellulose which has been treated and dry-decomposed in this manner is highly suitable for use as starting material in the procedure of the invention.

DESCRIPTION OF PREFERRED EMBODIMENTS

The invention is described in greater detail in the examples which follow. The scope of the invention is not, however, meant to be limited to the specific details of the examples.

In connection with the examples, the following information concerning the characteristics of cellulose solubility are pertinent:

One of the most important characteristics of cellulose solubility which is relevant in fiber spinning is the filterability of the cellulose. Filterability is described in the examples by the so-called clogging number defined in the article: H. Sihtola, Paperi ja Puu 44 (1962), No. 5, p. 295–300. In the method a miniature filter is used, having 3.8 cm$^2$ effective area, the filter material being Machevey-Nagel MN 616 paper. The filterability is calculated by the formula:

$$K_{W20,60} = \tfrac{1}{2} \cdot 10^4 \left( \frac{60}{P_{60}} - \frac{20}{P_{60}} \right), \text{ where}$$

$P_{20}$ = cellulose quantity (in g) passing through the filter in 20 min.
$P_{60}$ = cellulose quantity (in g) passing through the filter in 60 min.
$K_{W20,60}$ = clogging number.

EXAMPLE 1

Derivative cellulose, which has been split up with the aid of alkali to DP level 300, was neutralized with acetic acid and washed with water, dried and beaten in a hammer mill. 440 g of cellulose thus treated were impregnated at −40° C. in 500 ml of liquid ammonia, in which had been dissolved 36 g urea. The cellulose was kept in this solution below the boiling point of ammonia during 6 hours, whereupon the temperature was raised to room temperature. The ammonia having boiled off, the urea cellulose was placed in vacuum at 135° C. for 3 hours. Throughout this time an air flow produced by a water jet ejector was passed through the oven.

The reaction product was washed with methanol, three times with water, and once with methanol. The air-dry product had a degree of polymerization (DP) of 341 and nitrogen content 1.7%. The product was dissolved at −5° C. in an aqueous solution containing 10% NaOH, and 2% ZnO. Endeavors were made to adjust the ballviscosity to be about 50 seconds. The clogging number $K_{W20,60}$ was found to be 1485. The solution had a cellulose content of 5.5%.

EXAMPLE 2

Three batches of cellulose (30 g each) treated as described in Example 1, were impregnated at −40° C. with 500 ml ammonia in which had been dissolved, respectively, 11.1, 22.2 and 33.3 g urea, whereby molar urea: cellulose ratio of 1, 2 and 3, respectively, were attained. The impregnating periods were, respectively, 5.5, 6 and 6 hours.

The temperature of cellulose batches were raised to room temperature after the impregnating step and the ammonia was allowed to evaporate. The cellulose batches were thereafter placed in a vacuum oven and kept 3 hours at 136°–137° C.

The batches of carbamate thus obtained were washed after the reaction with methanol, three times with water, and one more time with methanol. The degree of depolymerization (DP) and nitrogen content of the products were measured. In solvent tests, the carbamate batches were dissolved in a solution containing 10% NaOH, and 2% zinc oxide. Endeavors were made to adjust the viscosity of the solutions to the 50 second level. The results are stated in the Table 1 below:

TABLE 1

| Batch | DP | N, % | Clogging Number | Viscosity | Cellulose, % |
|---|---|---|---|---|---|
| 1 | 341 | 1.7 | 1485 | 50 | 5.5 |
| 2 | 420 | 1.2 | 1545 | 54.6 | 4.8 |
| 3 | 410 | 1.2 | 1425 | 50.8 | 4.8 |

The low clogging numbers indicate that the solutions are highly suitable for spinning.

EXAMPLE 3

Two batches of cellulose (30 g each) treated as in Example 1, with cellulose DP values 430 and 350, were impregnated at −40° C. with 500 ml ammonia in which urea had been dissolved (7.8 and 6.2 g, respectively). After six hours impregnation, the temperature of the cellulose batches was raised to room temperature and the ammonia was allowed to evaporate.

Heat treatment was carried out as in Example 1, in a vacuum oven at 139°–140° C. The products were washed with methanol and water.

The characteristics of the products were determined and dissolving tests carried out as in Example 2. The results are stated in Table 2 below.

TABLE 2

| DP | N, % | Clogging number | Viscosity | Cellulose, % |
|---|---|---|---|---|
| 400 | 0.7 | (*) | 37.2 | 4.4 |
| 360 | 0.9 | 77012 | 61.8 | 5.4 |

(*)Clogging number too high to be measurable.

The results reveal that when the nitrogen content is low, the solutions contain insoluble particles in large amount.

EXAMPLES 4–8

Derivative cellulose which had been split up with alkali to DP level 300 was neutralized with acetic acid and washed with water, dried and beaten in a hammer mill. 40 g of cellulose treated in this way were impregnated at −40° C. with 450 ml of liquid ammonia in which urea had been dissolved. The cellulose was kept in this solution at the boiling point of ammonia below −33° C. during 3 to 6 hours, whereafter the ammonia was allowed to evaporate at room temperature. A heat treatment was then carried out in a vacuum oven at 140°–150° C. during 4 to 6 hours. An air flow of 20 liters per minute, produced by a water jet pump, passed through the oven throughout this period.

The reaction product was washed with methanol, three times with water and once more with methanol. DP of the air-dry product was determined, applying the SCAN-C15:62 standard, in copper ethylene diamine. Furthermore, the nitrogen content and the solubility expressed by the clogging number in a 10-% NaOH solution at −5° C. were determined.

Table 3 below gives the conditions of reaction employed, and the characteristics of the product.

perature of reaction between cellulose and urea, thereby obtaining cellulose having urea distributed

TABLE 3

| Example | Cellulose | | Reaction | | | | Product | | | Dissolving | |
|---|---|---|---|---|---|---|---|---|---|---|---|
| | Cellul. | Urea:Cellul. | Impregn. time, h | Reaction temper. | Reaction time, h | Reaction DP | N, % | $K_W$ | sec. | Viscos., % | Cellul., % |
| 4 | 300 | 3 | 6 | 140 | 6 | 230 | 3.2 | 850 | | 81 | 8.0 |
| 5 | 300 | 3 | 6 | 145 | 5 | 240 | 2.6 | 970 | | 80 | 8.0 |
| 6 | 300 | 2 | 6 | 140 | 4.5 | 240 | 2.5 | 960 | | 95 | 8.0 |
| 7 | 300 | 2 | 6 | 145 | 4.0 | 240 | 2.6 | 880 | | 75 | 8.0 |
| 8 | 300 | 3 | 3 | 150 | 4.0 | 240 | 2.0 | 1440 | | 81 | 8.0 |

EXAMPLE 9

As in Example 4, derivative cellulose was split down to level DP 300 and neutralized with acetic acid, washed with water and dried. 440 g cellulose thus treated were impregnated at −40° C. with 500 ml ammonia in which urea had been dissolved (urea:cellulose ratio 3). The cellulose was impregnated with this solution during 3 hours, whereafter the ammonia was evaporated at room temperature. Cellulose thus treated was heated in a vacuum oven at 132° C. for 6.5 hrs as in Example 4. The washed and dried product had DP 260, nitrogen content 2.1%, and clogging number of 815, determined in 10-% NaOH at −5° C.; the viscosity of the solution being 96 sec and the cellulose content, 8.0%.

While the invention has been described in particular with respect to specific proportions, temperatures and other conditions, it is apparent that variations and modifications thereof can be made.

What is claimed is:

1. Method of producing alkali-soluble cellulose carbamate, which comprises treating cellulose with a solution consisting essentially of liquid ammonia having urea dissolved therein at a temperature below the temperature of reaction between cellulose and urea, to cause distribution of the urea throughout the cellulose, removing the ammonia at a temperature below the temperature of reaction between cellulose and urea, thereby obtaining cellulose having urea distributed therethrough, and heating the thus obtained cellulose with urea distributed therethrough to a temperature sufficiently high to cause reaction between the cellulose and the urea, thus obtaining an alkali-soluble cellulose carbamate.

2. Method according to claim 1 wherein the cellulose is treated with the liquid ammonia having the urea dissolved therein at a temperature below −33° C.

3. Method according to claim 1 wherein the cellulose is treated with the liquid ammonia having the urea dissolved therein under pressure at a temperature higher than the boiling point of the ammonia.

4. Method according to claim 1 wherein the quantity of urea in the ammonia is between about 20–120% by weight of the cellulose.

5. Method according to claim 1 wherein the ammonia is removed by evaporation.

6. Method according to claim 1 wherein the cellulose having the urea distributed therethrough is heated to a reaction temperature of between about 110° and 150° C.

7. Method according to claim 6 wherein the reaction is effect at subatmospheric pressure.

8. Method according to claim 1 wherein the produced alkali-soluble cellulose carbamate is washed with liquid ammonia at a temperature between about −40° C. and +30° C.

* * * * *